(12) United States Patent
Bloch et al.

(10) Patent No.: US 6,330,307 B1
(45) Date of Patent: Dec. 11, 2001

(54) DISPLAY PANEL OVERLAY STRUCTURE AND METHOD FOR TRACING INTERFACE MODULES IN A TELECOMMUNICATIONS PATCH SYSTEM

(75) Inventors: Brian Matthew Bloch, North Plainfield; Golam Mabud Choudhury, Warren, both of NJ (US); Lyndon D. Ensz, Omaha, NE (US); Michael Gregory German, Secaucus, NJ (US); Daniel Warren Macauley, Fishers, IN (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 09/247,385

(22) Filed: Feb. 10, 1999

(51) Int. Cl.[7] ........................................... H04M 1/24
(52) U.S. Cl. ................. 379/25; 379/27.01; 379/156; 379/327; 340/825.36; 348/552
(58) Field of Search .................. 379/24, 25, 26, 379/27, 28, 29, 32, 156, 160, 164, 165, 166, 343, 397, 399, 423, 248; 340/825.36, 825.47, 825.48; 348/552

(56) References Cited

U.S. PATENT DOCUMENTS

| | | | |
|---|---|---|---|
| 3,573,792 | * 4/1971 | Reed | 340/339 |
| 4,018,997 | * 4/1977 | Hoover et al. | 379/166 |
| 4,096,359 | * 6/1978 | Barsellotti | 379/166 |
| 4,140,885 | * 2/1979 | Verhagen | 379/166 |
| 4,196,316 | * 4/1980 | McEowen et al. | 379/166 |
| 4,796,294 | * 1/1989 | Nakagawara | 379/258 |
| 5,550,755 | * 8/1996 | Martin et al. | 340/825.36 |
| 5,727,055 | * 3/1998 | Ivie et al. | 379/156 |
| 5,832,071 | * 11/1998 | Voelker | 379/165 |
| 5,854,824 | * 12/1998 | Bengal et al. | 379/34 |
| 6,222,908 | * 4/2001 | Bartolutti et al. | 379/27 |

* cited by examiner

*Primary Examiner*—Binh Tieu
(74) *Attorney, Agent, or Firm*—Gibbons, Del Deo, Dolan, Griffinger & Vecchione

(57) ABSTRACT

A graphics overlay for displaying the location of a traced connector port in a telecommunications patching system. The graphics overlay is the visible portion of a tracing interface module that is viewed by a technician performing a patch cord tracing procedure. The graphics overlay serves three primary functions. The first function is to provide is a visual indication that can inform a technician as to the location of a patch cord in a telecommunications patch system. The second function is to provide a trace button so that a technician can initiate a trace from any patch cord connect port in the patching system. Lastly, the third function is to identify the patch cord at each connector port in the telecommunications patching system. The present invention provides different embodiments of a graphics overlay that all embody the necessary functions yet are uniquely adapted for use in a telecommunications patch cord tracing system.

19 Claims, 4 Drawing Sheets

DISPLAY PANEL OVERLAY STRUCTURE AND METHOD FOR TRACING INTERFACE MODULES IN A TELECOMMUNICATIONS PATCH SYSTEM

RELATED APPLICATIONS

This application is related to the following co-pending applications, the disclosures of which are incorporated into this specification by reference.

U.S. patent application Ser. No. 09/247,613, entitled SYSTEM AND METHOD FOR ADDRESSING AND TRACING PATCH CORDS IN A DEDICATED TELECOMMUNICATIONS SYSTEM U.S. patent application Ser. No. 09/247,614, entitled SYSTEM AND METHOD OF OPERATION FOR A TELECOMMUNICATIONS PATCH SYSTEM;

U.S. patent application Ser. No. 09/247,269, entitled TRACING INTERFACE MODULE FOR PATCH CORDS IN A TELECOMMUNICATIONS PATCH SYSTEM;

U.S. patent application Ser. No. 09/247,270, entitled METHOD AND DEVICE FOR DETECTING THE PRESENCE OF A PATCH CORD CONNECTOR IN A TELECOMMUNICATIONS PATCH SYSTEM;

U.S. patent application Ser. No. 09/247,237, entitled METHOD AND DEVICE FOR DETECTING THE PRESENCE OF A PATCH CORD CONNECTOR IN A TELECOMMUNICATIONS PATCH SYSTEM USING PASSIVE DETECTION SENSORS;

U.S. patent application Ser. No. 09/404,420, entitled SYSTEM AND METHOD FOR IDENTIFYING SPECIFIC PATCH CORD CONNECTORS IN A TELECOMMUNICATIONS PATCH SYSTEM; and U.S. patent application Ser. No. 09/404,619, entitled SYSTEM AND METHOD OF INTERCONNECTING TRACING INTERFACE MODULES TO A CENTRAL CONTROLLER IN A TELECOMMUNICATIONS PATCH SYSTEM.

BACKGROUND OF THE INVENTION

1. Field of the Invention

In general, the present invention relates to the structure of tracing systems that are used to trace patch cords in a dedicated telecommunications patching system. More particularly, the present invention relates to the displays that are used in such tracing systems that inform a technician as to the location of the ends of the patch cord being traced. The present invention also relates to systems that enable a technician to transmit and receive data with a telecommunications system from a remote location.

2. Description of the Prior Art

Many businesses have dedicated telecommunication systems that enable computers, telephones, facsimile machines and the like to communicate with each other, through a private network, and with remote locations via a telecommunications service provider. In most buildings, the dedicated telecommunications system is hard wired using telecommunication cables that contain conductive wire. In such hard wired systems, dedicated wires are coupled to individual service ports throughout the building. The wires from the dedicated service ports extend through the walls of the building to a telecommunications closet or closets. The telecommunications lines from the interface hub of a main frame computer and the telecommunication lines from external telecommunication service providers are also terminated within the telecommunications closets.

A patching system is used to interconnect the various telecommunication lines within the telecommunications closet. In a telecommunications patching system, all of the telecommunication lines are terminated within the telecommunications closet in an organized manner. The organized terminations of the various lines are provided via the structure of the telecommunications closet. Within the telecommunications closet is typically located a mounting frame. On the mounting frame is connected a plurality of racks. The telecommunications lines terminate on the racks, as is explained below.

Referring to FIG. 1, a typical prior art rack 10 is shown. The rack 10 retains a plurality of patch panels 12 that are mounted to the rack 10. On each of the patch panels 12 are located port assemblies 14. The port assemblies 14 each contain six RJ-45 telecommunication connector ports 16.

Each of the different telecommunication connector ports 16 is hard wired to one of the system's telecommunications lines. Accordingly, each telecommunication line is terminated on a patch panel 12 in an organized manner. In small patch systems, all telecommunications lines may terminate on the patch panels of the same rack. In larger patch systems, multiple racks are used, wherein different telecommunications lines terminate on different racks.

In the shown embodiment of FIG. 1, the interconnections between the various telecommunications lines are made using patch cords 20. Both ends of each patch cord 20 are terminated with connectors 22, such as an RJ-45 telecommunication connector or a RJ-11 telecommunications connector. One end of the patch cord 20 is connected to the connector port 16 of a first telecommunications line and the opposite end of the cord is connected to the connector port 16 of a second telecommunications line. By selectively connecting the various lines the patch cords 20, any combination of telecommunications lines can be interconnected.

In many businesses, employees are assigned their own computer network access number exchange so that the employee can interface with the companies main frame computer or computer network. When an employee changes office locations, it is not desirable to provide that employee with newly addressed telecommunication pots. Rather, to preserve consistency in communications, it is preferred that the exchanges of the telecommunication connection ports in the employee's old office be transferred to the telecommunications ports in the employee's new office. To accomplish this task, the patch cords in the telecommunication closet are rearranged so that the employee's old exchanges are now received in his/her new office.

As employees, move, change positions, add lines and subtract lines, the patch cords in a typical telecommunications closet are rearranged quite often. The interconnections of the various patch cords in a telecommunications closet are often logged in either paper or computer based log. However, technicians often neglect to update the log each and every time a change is made. Inevitably, the log is less than 100% accurate and a technician has no way of reading where each of the patch cords begins and ends. Accordingly, each time a technician needs to change a patch cord, that technician manually traces that patch cord between two connector ports. To preform a manual trace, the technician locates one end of a patch cord. The technician then manually follows the patch cord until he/she finds the opposite end of that patch cord. Once the two ends of the patch cord are located, the patch cord can be positively identified.

It takes a significant amount of time for a technician to manually trace a particular patch cord. Furthermore, manual tracing is not completely accurate and technicians often accidently go from one patch cord to another during a manual trace. Such errors result in misconnected telecommunication lines which must be later identified and corrected.

One of the primary functions of a patch cord tracing system is to clearly identify the location of the ends of the patch cord being traced. In a telecommunications rack, space is limited. Often patch panels are spaced closely together. Accordingly, the various connector ports in the telecommunications closet are also spaced closely together. In such tight quarters, a tracing location indication must be highly visible and must clearly identify only a single connector port.

A need therefore exists in the field of telecommunication patching systems for a tracing system that clearly identifies the ends of a traced patch cord in a crowded telecommunication closet.

SUMMARY OF THE INVENTION

The present invention is a graphics overlay for displaying the location of a traced connector port in a telecommunications patching system. The graphics overlay is the visible portion of a tracing interface module that is viewed by a technician performing a patch cord tracing procedure. The graphics overlay serves three primary functions. The first function is to provide is a visual indication that can inform a technician as to the location of a patch cord in a telecommunications patch system. The second function is to provide a trace button so that a technician can initiate a trace from any patch cord connect port in the patching system. Lastly, the third function is to identify the patch cord at each connector port in the telecommunications patching system. The present invention provides different embodiments of a graphics overlay that all embody the necessary functions yet are uniquely adapted for use in a telecommunications patch cord tracing system.

BRIEF DESCRIPTION OF THE DRAWINGS

For a better understanding of the present invention, reference is made to the following description of and exemplary embodiment thereof, considered in conjunction with the accompanying drawings, in which.

DETAILED DESCRIPTION OF THE DRAWINGS

Figure 1:
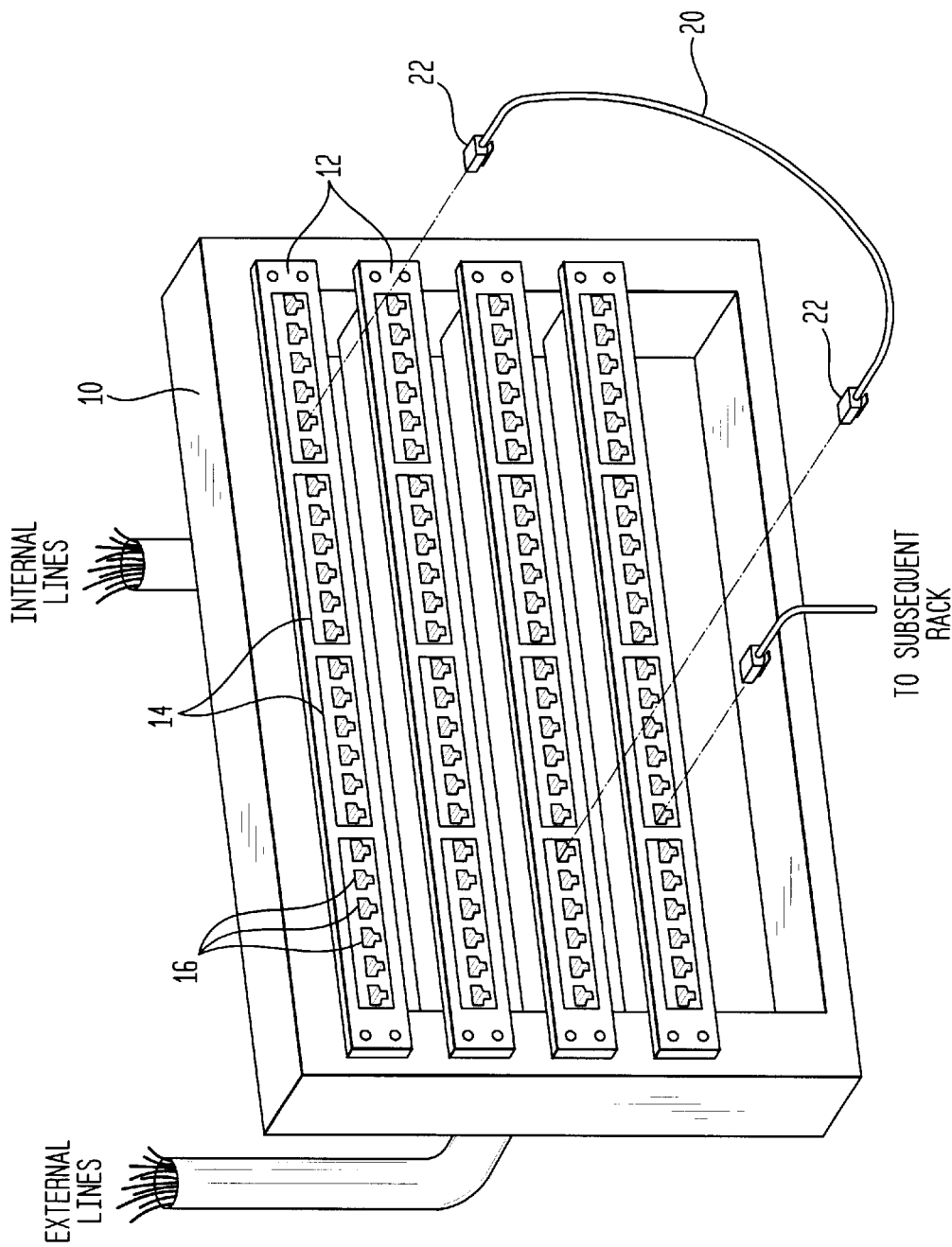
FIG. 1 is a perspective view of a typical prior art telecommunications rack assembly containing multiple patch panels with connector ports that are selectively interconnected by patch cords.
Figure 2:
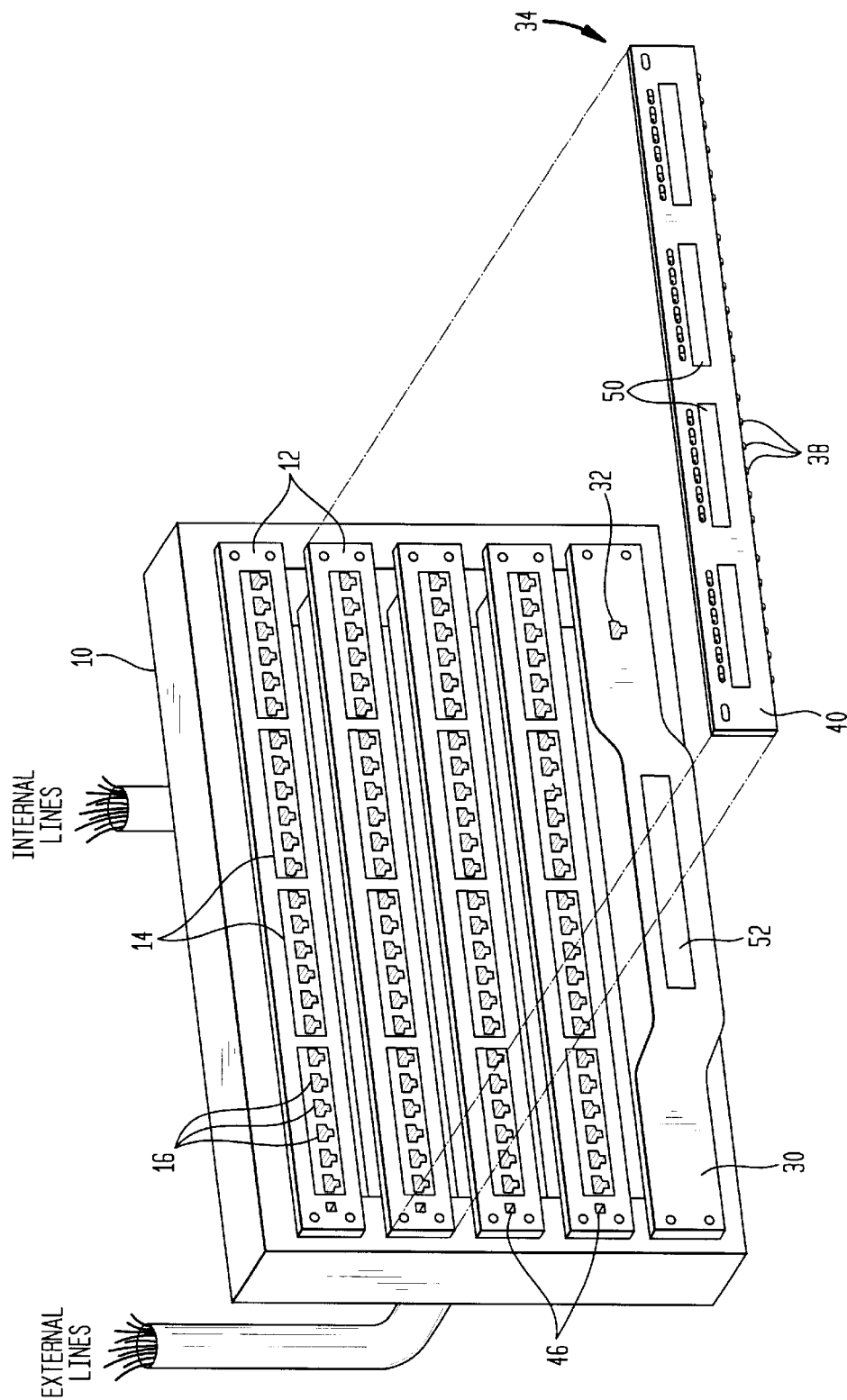
FIG. 2 is a perspective view of a tracing interface module and rack controller in accordance with the present invention, shown in conjunction with the prior art telecommunications rack assembly of FIG. 1.

Referring to FIG. 2, a conventional telecommunications rack 10 is shown, such as the one previously described in regard to FIG. 1. The telecommunications rack 10 contains a plurality of patch panels 12 that are mounted in parallel horizontal rows within the rack 10. Each of the patch panels 12 contains a plurality of patch port assemblies 14. The connector ports 16 associated with each of the patch port assemblies 14 are hard wired to the various lines that enter the telecommunications closet.

In the present invention system, a rack controller 30 is mounted to each rack 10 in the overall patch system. The rack controller 30 contains a central processing unit (CPU). The CPU is capable of independently running line tracing programs and also contains a remote access port 32 that enables the CPU to be accessed by a remote computer. Remote access of the rack controller 30 is the subject of related co-pending patent application Ser. No. 09/247,614, entitled System And Method Of Operation For A Telecommunications Patch System, which has already been incorporated into this application by reference.

The purpose of the rack controller 30 is to operate and gather data from the various tracing interface modules 34, as will be later explained. The tracing interface modules 34 are modules that mount to the face of each patch panel 12 on the rack 10. The tracing interface modules 34 are positioned above the various connector ports 16 located on a patch panels 12 and provide an interface through which data about each connector port 16 can be transmitted to and from the rack controller 30.

The tracing interface module 34 can have multiple different configurations. In the shown embodiment, the tracing interface module 34 mounts to the face surface of the patch panel 12 above the connector ports 16. From FIG. 2, it can be seen that extending below each tracing interface module 34 are a plurality of sensors 38. Each sensor 38 corresponds in position with one of the connector ports 16 on the patch panel 12. As the terminated end of a patch cord 20 (FIG. 1) is connected to a connector port 16, the presence of the patch cord is detected by a sensor 38 and read to the rack controller 30. The rack controller 30 is therefore capable of automatically determining when a patch cord has been added or removed from any connector port 16 on the rack 10.

In the shown embodiment, the sensors 38 are mechanical elements. It should be understood that the use of such sensor is merely exemplary and passive optical-based or electrical based sensors can also be used. The use of alternate embodiments of sensors is described in co-pending patent application Ser. No. 09/247,270, entitled Method And Device For Detecting The Presence Of A Patch Cord Connector In A Telecommunications Patch System; and U.S. patent application Ser. No. 09/404,420, entitled System And Method For Identifying Specific Patch Cord Connectors In A Telecommunications Patch System. Both of these co-pending applications have been incorporated into this disclosure by reference.

In addition to the sensors 38, the shown tracing interface module 34 also contains a graphics overlay 40. The graphics overlay 40 is the part of the tracing interface module 34 that is viewed by a technician. Accordingly, the ability of a tracing interface module 34 to identify a specific connector port 16 is transmitted through the structure of the graphics overlay 40.

Figure 3:
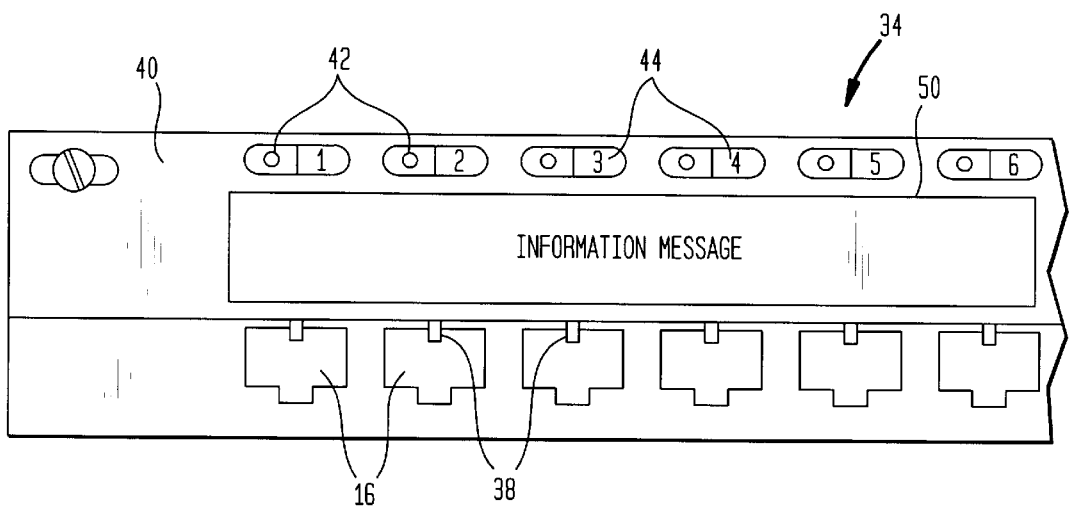
FIG. 3 is an enlarged, fragmented view of a section of a graphics overlay on a tracing interface module.

Referring to FIG. 3, it can be seen that the graphics overlay 40 contains surface visible light emitting diodes (LEDs) 42 and tracing buttons 44. An LED 42 and tracing button 44 are provided for each connector port 16 when the tracing interface module 34 is connected to the patch panel 12 (FIG. 2). Accordingly, once the tracing interface module 34 is in place, each connector port 16 on the patch panel has an LED 42 and tracing button 44 that corresponds in position to that connector port 16.

An indicia may be printed on each of the tracing buttons 44 to help identify the different tracing buttons 44. A liquid crystal display (LCD) 50 is disposed below the LEDs 42 and trace buttons 44. The LCD 50 is used to display informative messages as will later be described.

Referring back to FIG. 2, it will now be understood that when a patch cord 20 (FIG. 1) is placed into any connector port 16, or removed from any connector port, that change is sensed by a sensor 38 and is read to the rack controller 30. The rack controller 30 is therefore capable of monitoring any and all changes that occur to the patch cords in the patch system over time. The rack controller 30 is therefore capable of automatically keeping an accurate log of all changes that have occurred to the patch cords since the installation of the present invention system. Accordingly, if a technician is servicing the patch system, that technician can read the accurate log straight from the rack controller 30. The log can be read out on the display 52 of the rack controller 30 or can be remotely accessed via the connector port 32 on the rack controller 30.

In addition to keeping an accurate log of all physical patch cord changes, the tracing system can also be used to accurately trace the end points of any patch cord 20 (FIG. 1). For instance, suppose a technician wants to find the opposite end of a particular patch cord. That technician can press the trace button 38 that corresponds in position to the known end of the patch cord. Upon the pressing of the trace button 38, the rack controller 30 will review its own log and will determine where the opposite end of that patch cord is located. The rack controller will then light the LED 42 that corresponds in position to the opposite end of the targeted patch cord. The technician then need only look for the lit LED 42 on one of the tracing interface modules 34 to find the opposite end of the targeted patch cord. The wasted time and inaccuracy of manually tracing patch cords are eliminated.

As has been previously mentioned, at least one liquid crystal display (LCD) 50 is contained within the graphics overlay 40 of the tracing interface module 34. The LCD 50 can extend across the entire tracing interface module 34. However, in the shown embodiment, four separate LCDs 40 are provided, wherein each LCD 40 is positioned over the connector ports 16 in one patch port assemblies 14 on a patch panel 12.

In addition to lighting the LEDs 42 to show the ends of the various patch cords, the rack controller 30 may also display instructions or useful information on the LCDs 40 in the form, for example, of alpha numeric characters. For example, the location of a patch cord by rack number and patch panel may be displayed. Similarly an icon may flash that corresponds in position to the connector port 16 identified during a tracing procedure. Alternatively, the identity of the patch cord may be displayed, thereby helping a technician verify that he/she is servicing the correct patch cord. By using the LCD 40 to automatically identify each connector port 16, paper labels become obsolete.

Figure 4:
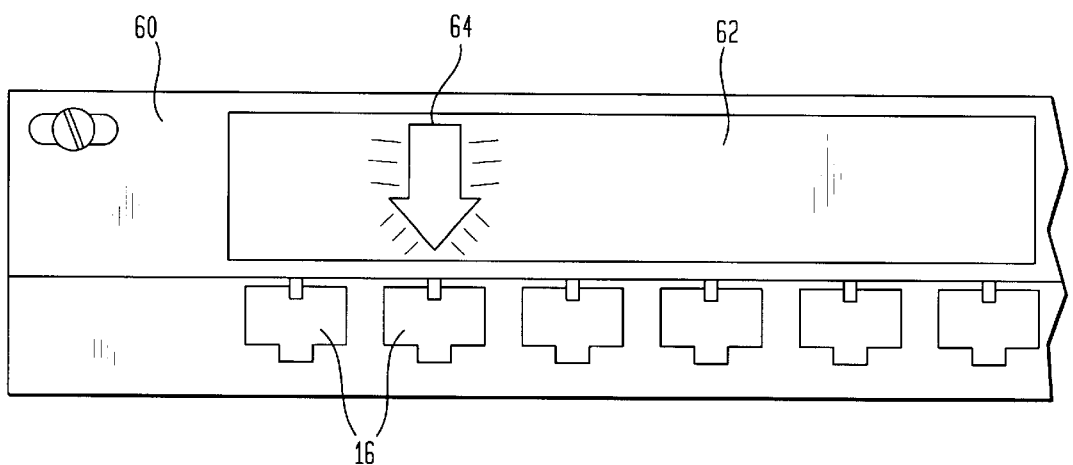
FIG. 4 is an enlarged, fragmented view of an alternate embodiment of a graphics overlay on a tracing interface module.

Referring now to FIG. 4, an alternate embodiment of a graphics overlay 60 for the tracing interface module is shown. In this embodiment, a touch screen 62 is provided in place of the previously described LCDs. The use of a touch screen 62 eliminates the need for separate trace buttons. Rather, in order for a technician to initiate a trace, that technician need only touch the touch screen 62 above a particular connector port. The rack controller 30 (FIG. 2) would treat the touching of the touch screen 62 in the same manner as the touching of a trace button.

By providing the proper location icon 64 on the touch screen, the need for an LED for each connector port 16 can also be eliminated. Rather, the touch screen 62 can flash, thereby providing a clearly visible location indication to a technician performing a trace.

Using an embodiment of the graphics overlay that contains an electronic display also enables data to displayed within the telecommunications closet that has been transmitted to the telecommunications closet from a remote location. This enables technicians to receive and execute paperless work orders. Transmitting data to and from a telecommunications closet from a remote location is described in co-pending patent application Ser. No. 09/247,614, entitled, System And Method Of Operation For A Telecommunications Patch System.

Figure 5:
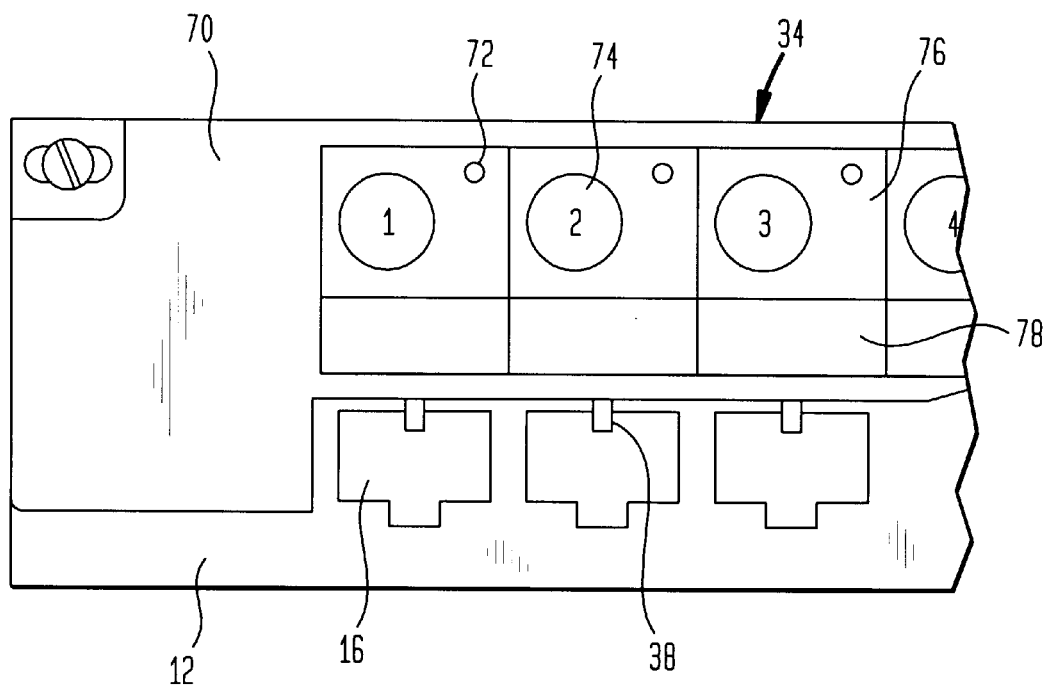
FIG. 5 is an enlarged, fragmented view of a second alternate embodiment of a graphics overlay on a tracing interface module.

Referring to FIG. 5, a simplified version of a graphics overlay 70 is shown. In this embodiment, no display is present. Rather, the graphic overlay 70 for the tracing interface module 34 contains light emitting diodes (LEDs) 72 and tracing buttons 74 positioned within individual graphics boxes 76. A graphics box 76 with an LED 72 and tracing button 74 is provided for each connector port 16 when the tracing interface module 34 is connected to the patch panel. Accordingly, once the tracing interface module 34 is in place, each connector port 16 on the patch panel has an LED 72 and tracing button 74 that corresponds in position to that connector port 16.

Each graphics box 76 also contains an indicia that is printed on each of the tracing buttons 74 to help identify the different tracing buttons 74. Additionally, a labeling area 78 is provided in each graphics box 76 below each tracing button 74 for further identification. Each labeling area 78 can be written upon to identify the port in a manner useful to the system's technician.

In all embodiments of the graphics overlay described, the graphics overlay contained a means for indicating the location of a specific connector port, a means for initiating a patch cord trace and an identifying means for identifying the patch cord terminations. It will be understood that the embodiments of the present invention specifically shown and described are merely exemplary and that a person skilled in the art can make alternate embodiments using different configurations and functionally equivalent components. All such alternate embodiments are intended to be included in the scope of this invention as set forth in the following claims.

What is claimed is:

1. A patch cord tracing module assembly adapted to be connected to a patch panel in a telecommunications closet, said assembly comprising:

a module housing having a front surface and a bottom edge;

at least one electronic display disposed on said front surface of said module housing, wherein said electronic display is capable of displaying alpha-numeric characters;

a plurality of patch cord connector sensors disposed proximate said bottom edge of said module housing, wherein said patch cord connector sensors are capable of detecting a patch cord connector that comes into close proximity with said patch cord connector sensors; and a manually operable trace initiation mechanism disposed on said front surface of said module in close proximity to each of said plurality of patch cord connector sensors.

2. The assembly according to claim 1, further including a plurality of lights disposed on said face surface of said module assembly, wherein at least one light is associated with each of said patch cord connector sensors.

3. The assembly according to claim 1, wherein said patch cord connector sensors are gathered in multiple identical groupings of six proximate said bottom edge of said module housing.

4. The assembly according to claim 3, wherein said patch cord tracing module contains multiple electronic displays and each display is located proximate one of said groupings of said patch cord connector sensors.

5. The assembly according to claim 1, wherein said electronic display includes a touch screen.

6. In a telecommunications patching system having a plurality of connector ports disposed on at least one patch panel, a system for tracing patch cords from one connector port to another, comprising:

one or more tracing interface modules adapted to be interconnected to one or more patch panels in the telecommunications patching system, wherein each tracing interface module provides an electronic display, a manually operable trace initiation mechanism located proximate to each of said connector ports, and a patch cord sensor for sensing the presence of a patch cord to each of the connector ports located on that patch panel; and a systems controller coupled to each said electronic display, each said manually operable trace initiation mechanism and each said patch cord sensor, wherein said systems controller determines from said sensor if a patch cord is connected to each of said connector ports and said systems controller identifies each connector port by utilizing said electronic display.

7. The system according to claim 6, wherein said trace initiation mechanism is a touch screen disposed in front of said electronic display.

8. The system according to claim 6, wherein said trace initiation mechanism is a push button.

9. The system according to claim 6, wherein each said patch panel has a face surface of a predetermined length and width upon which said connector ports are exposed and each said tracing interface module is sized to mount on said face surface within said length and width without obstructing said connector ports.

10. The system according to claim 6, wherein said tracing interface module further includes a light emitting diode associated with each patch cord sensor, wherein each said light emitting diode is controlled by said systems controller.

11. The system according to claim 6, wherein said patch cord sensor is a mechanical switch that detects the patch cord when present within a connector port.

12. A telecommunications patching system having point-to-point tracing capabilities, comprising:

at least one rack structure;

a plurality of patch panels mounted to each said rack structure;

a plurality of connector ports disposed on each of said patch panels;

a plurality of patch cords for selectively interconnecting different pairs of connector ports;

tracing modules adapted to be mounted to said patch panels above said connector ports, wherein each said tracing module contains a patch cord sensor for sensing the presence of a patch cord in each of said connector ports and an electronic display located on each of said tracing modules proximate each of said patch cord sensors for identifying a selected connector port from among said plurality of connector ports.

13. The system according to claim 12, further including a controller on each said rack structure that is coupled to each of said tracing modules on that rack structure.

14. The system according to claim 13, wherein each said electronic display displays data read to it from said systems controller.

15. The system according to claim 13, wherein each said tracing module contains a trace initiation mechanism that is associated in position with each of said connector ports.

16. The system according to claim 15, wherein said trace initiation mechanism is a touch screen disposed in front of each said electronic display.

17. The system according to claim 15, wherein said trace initiation mechanism is a push button.

18. The system according to claim 12, wherein each said patch panel has a face surface of a predetermined length and width upon which said connector ports are exposed and each said tracing interface module is sized to mount on said face surface within said length and width without obstructing said connector ports.

19. The system according to claim 6, wherein said sensor is a mechanical switch that detects the patch cord when present within a connector port.

\* \* \* \* \*